US006689490B2

(12) United States Patent
Weber et al.

(10) Patent No.: US 6,689,490 B2
(45) Date of Patent: Feb. 10, 2004

(54) DISPLAY ELEMENT FOR EMPLOYMENT IN A MAGNETIC ANTI-THEFT SECURITY SYSTEM

(75) Inventors: Hartwin Weber, Hanau (DE); Gernot Hausch, Langenselbold (DE); Ottmar Roth, Gründau (DE)

(73) Assignee: Vacuumschmelze GmbH, Hanau (DE)

( * ) Notice: Subject to any disclaimer, the term of this patent is extended or adjusted under 35 U.S.C. 154(b) by 0 days.

(21) Appl. No.: 10/371,894

(22) Filed: Feb. 21, 2003

(65) Prior Publication Data

US 2003/0129445 A1 Jul. 10, 2003

Related U.S. Application Data

(63) Continuation of application No. 09/269,490, filed as application No. PCT/DE98/01984 on Jul. 15, 1998, now abandoned.

(30) Foreign Application Priority Data

Jul. 30, 1997 (DE) ........................................ 197 32 872

(51) Int. Cl.[7] .......................... B32B 15/18; H01F 1/00; G08B 13/24

(52) U.S. Cl. ....................... 428/682; 116/204; 148/120; 148/121; 148/309; 148/310; 148/311; 335/296; 340/568.1; 428/611; 428/636; 428/686; 428/900; 428/928

(58) Field of Search ................................ 428/682, 611, 428/636, 686, 900, 928; 148/120, 121, 309, 310, 311; 116/204; 335/296; 340/568.1

(56) References Cited

U.S. PATENT DOCUMENTS 6,157,301 A * 12/2000 Radeloff et al. ............ 148/310
6,166,636 A * 12/2000 Herget et al. ............... 148/310

OTHER PUBLICATIONS

"A Study of Semihard Magnet Alloys for Latching Reed Relays," Tokuyoshi, IEEE Trans. on Magnetics, Sep., 1971, pp. 664–667.

"Connection between Structure and Magnetic Properties of a Magnetically Semi–Permanent Fe–Ni–Al–Ti Alloy," Wieser et al., Phys. Stat. (a), vol. 63 (1981) pp. 487–494, (no month given).

* cited by examiner

*Primary Examiner*—Robert R. Koehler
(74) *Attorney, Agent, or Firm*—Schiff Hardin & Waite

(57) ABSTRACT

Display Element for Employment in a Magnetic Anti-theft Security System A semi-hard magnetic alloy for activation strips in magnetic anti-theft security systems is disclosed that contains 8 to 25 weight % Ni, 1.5 to 4.5 weight % Al, 0.5 to 3 weight % Ti and balance iron. The alloy is distinguished over known, employed alloys by excellent magnetic properties and a high resistance to corrosion. Further, the inventive alloy can be excellently cold-worked before the annealing.

3 Claims, 4 Drawing Sheets

DEMAGNETIZATION DEPENDENT ON COERCIVITY $H_C$

TENSILE STRESS SENSITIVITY OF REMANENCE $B_r$

DISPLAY ELEMENT FOR EMPLOYMENT IN A MAGNETIC ANTI-THEFT SECURITY SYSTEM

Figure 1:
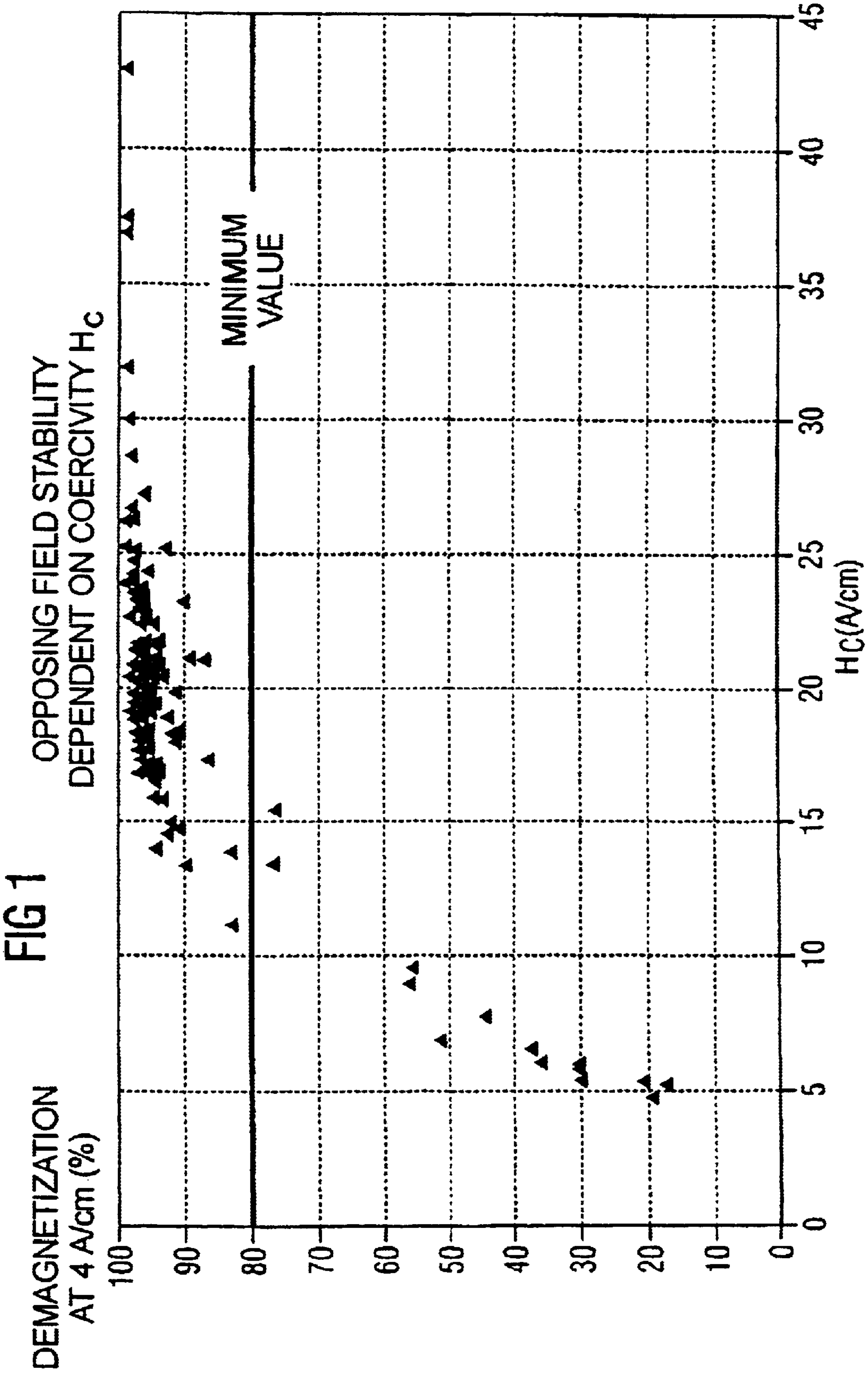

This application is a continuation of prior application No. 09/269,490, filed Jun. 8, 1999, now abandoned, which is a 371 of PCT/DE98/01984, filed Jul. 15, 1998.

The invention is directed to a display element for employment in a magnetic anti-theft security system, composed of:

1. an oblong alarm strip composed of an amorphous ferromagnetic alloy, and at least
2. one activation strip composed of a semi-hard magnetic alloy.

Such magnetic anti-theft security systems and display elements are notoriously known and described in detail in, for example, EP 0 121 649 B1 or, respectively, WO 90/03652. First, there are magneto-elastic systems wherein the activation strip serves for activation of the alarm strip by magnetizing it; second, there are harmonic systems wherein the activation strip, after being magnetized, serves for the deactivation of the alarm strip.

The alloys with semi-hard magnetic properties that are employed for the pre-magnetization strip include Co—Fe—V alloys, which are known as VICALLOY, Co—Fe—Ni alloys, which are known as VACOZET, as well as Fe—Co—Cr alloys. These known semi-hard magnetic alloys contain high cobalt parts, some at least 45 weight %, and are correspondingly expensive.

In their magnetically finally annealed condition, further, these alloys are brittle, so that they do not exhibit adequate ductility in order to adequately meet the demands given display elements for anti-theft security systems. One important demand, namely, is that these activation strips should be insensitive to bending or, respectively, deformation.

In the meantime, further, a switch has been made to introducing the display elements in anti-theft security systems directly into the product to be secured (source tagging). The additional demand arises as a result thereof that the semi-hard magnetic alloys can also be magnetized from a greater distance or, respectively, with smaller fields. It has been shown that the coercive force $H_c$ must be limited to values of at most 24 A/cm.

On the other hand, however, an adequate opposing field stability is also required, as a result whereof the lower limit value of the coercive force is determined. Only coercive forces of at least 10 A/cm are thereby suited.

Further, the remanence should be optimally slight under bending or, respectively, tensile stress. A change of less than 20% is prescribed as guideline.

It is therefore an object of the present invention to continue to develop the initially cited display elements with respect to their pre-magnetization strip to the effect that the aforementioned demands are met.

This object is inventively achieved in that the pre-magnetization strips are composed of a semi-hard magnetic alloy that is composed of 8 to 25 weight % nickel, 1.5 to 4.5 weight % aluminum, 0.5 to 3 weight % titanium and the balance iron.

The alloy can further contain 0 to 5 weight % cobalt and/or 0 to 3 weight % molybdenum or chromium and/or at least one of the elements Zr, Hf, V, Nb, Ta, W, Mn, Si in individual parts of less than 0.5 weight % of the alloy and in an overall part of less than 1 weight % of the alloy and/or at least one of the elements C, N, S. P, B, H, O in individual parts of less than 0.2 weight % of the alloy and in an overall part of less than 1 weight % of the alloy.

The alloy is characterized by a coercive strength $H_c$ of 10 to 24 A/cm and a remanence $B_r$ of at least 1.3 T (13,000 Gauss).

The inventive alloys are highly ductile and can be excellently coldworked before the annealing, so that crossectional reductions of more than 90% are also possible. Pre-magnetization strips that comprise thicknesses of less than 0.05 mm can be manufactured from such alloys, particularly by cold rolling. Further, the inventive alloys are characterized by excellent magnetic properties and resistance to corrosion.

A quite particularly advantageous alloy is a semi-hard magnetic iron alloy according to the present invention that contains 13.0 to 17.0 weight % nickel, 1.8 to 2.8 weight % aluminum as well as 0.5 to 1.5 weight % titanium. By reducing the aluminum content, the magnetostriction can, in particular, be especially favorably set.

Typically, the pre-magnetization strips are manufactured by melting the alloy under vacuum and casting to form an ingot. Subsequently, the ingot is hot-rolled into a tape at temperatures above 800° C., then intermediately annealed at a temperature above 800° C. and then rapidly cooled. A cold working, expediently cold rolling corresponding to a cros-sectional reduction of a proximately 90% is followed by an intermediate annealing at approximately 700° C. A cold working, expediently cold rolling corresponding to a cros-sectional reduction of at least 60%, preferably 75% or more subsequently occurs. As last step, the cold-rolled tape is annealed at temperatures from approximately 400° C. to 600°. The pre-magnetization strips are then cut to length.

Figure 2:
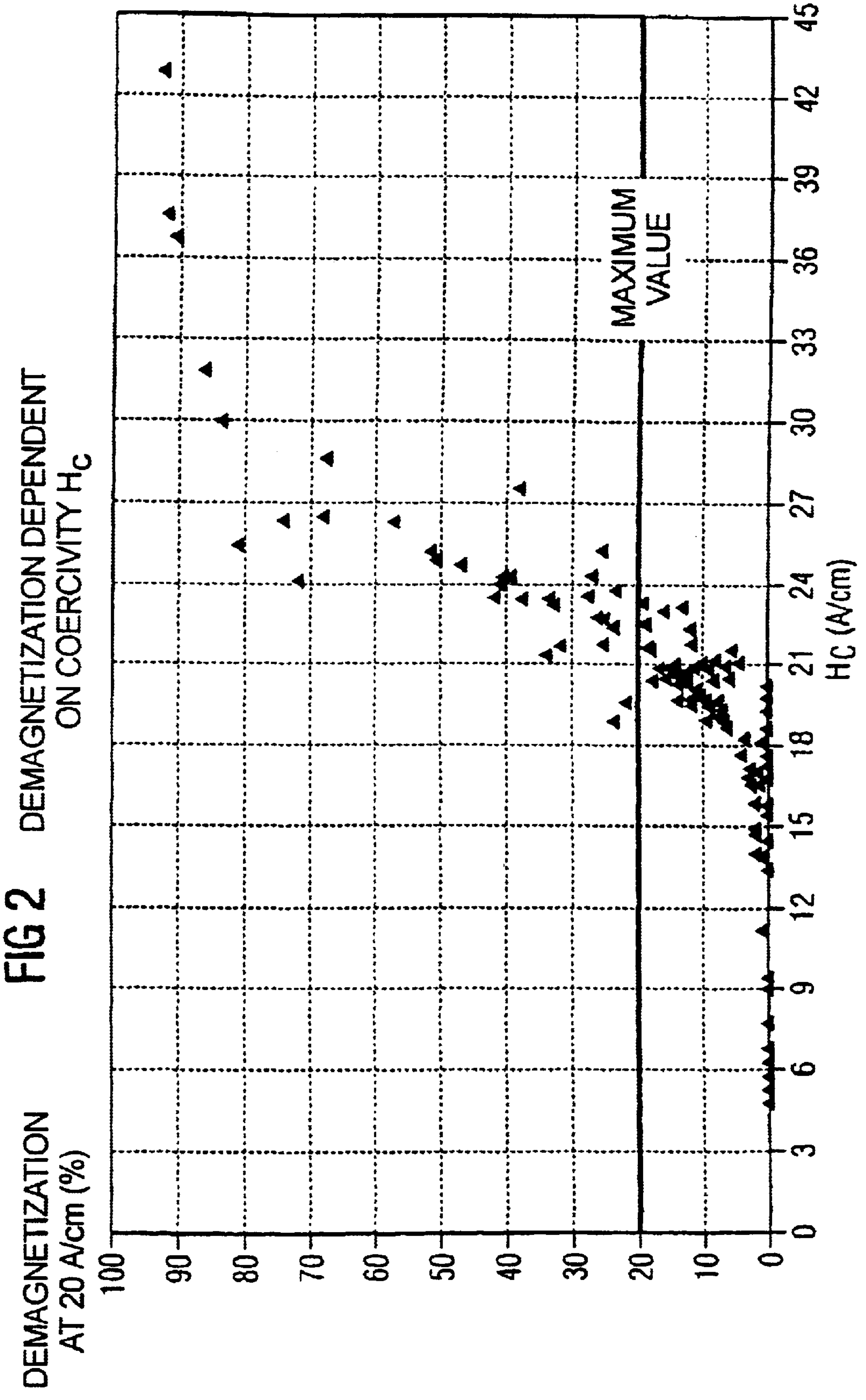
Figure 3:
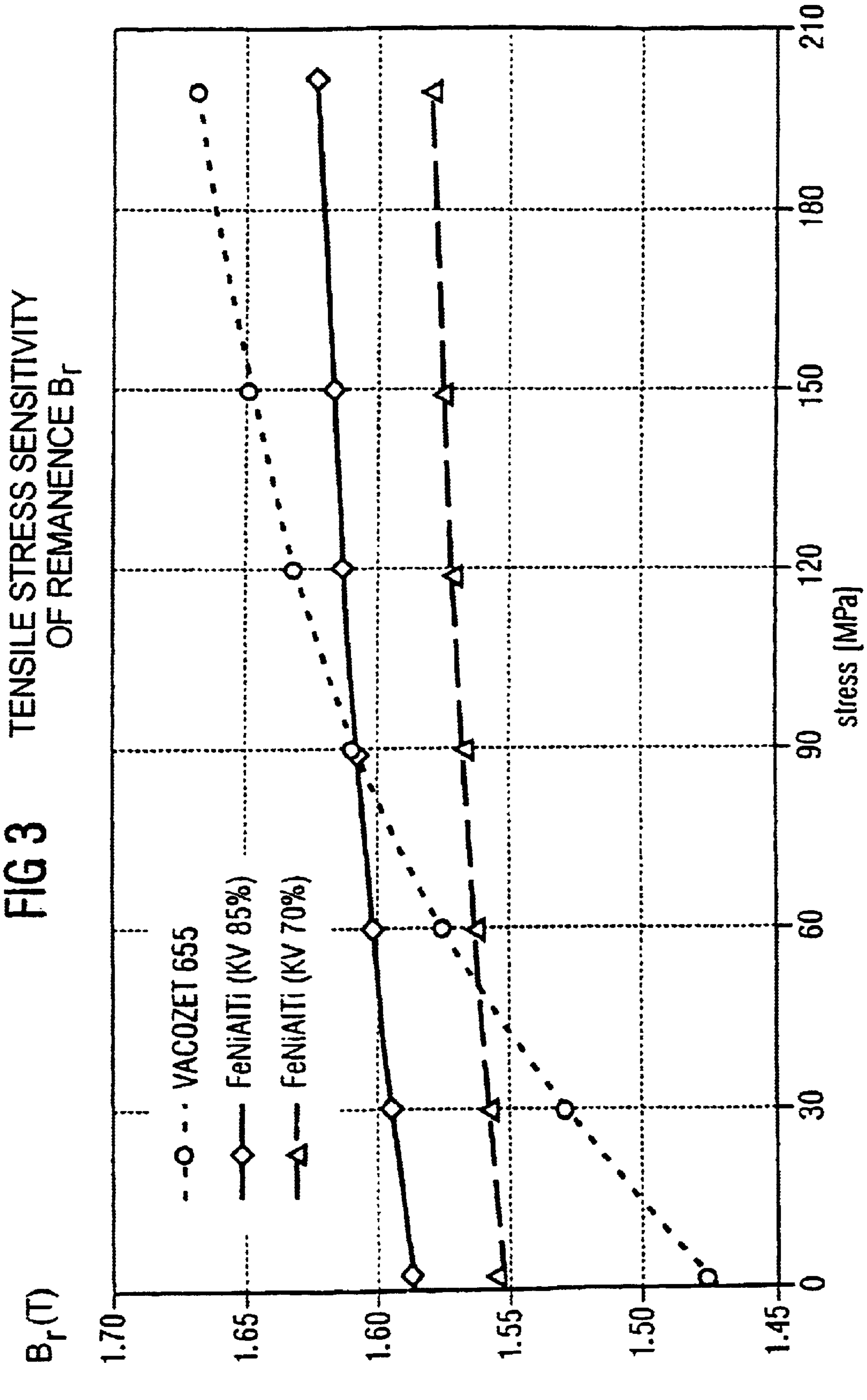
Figure 4:
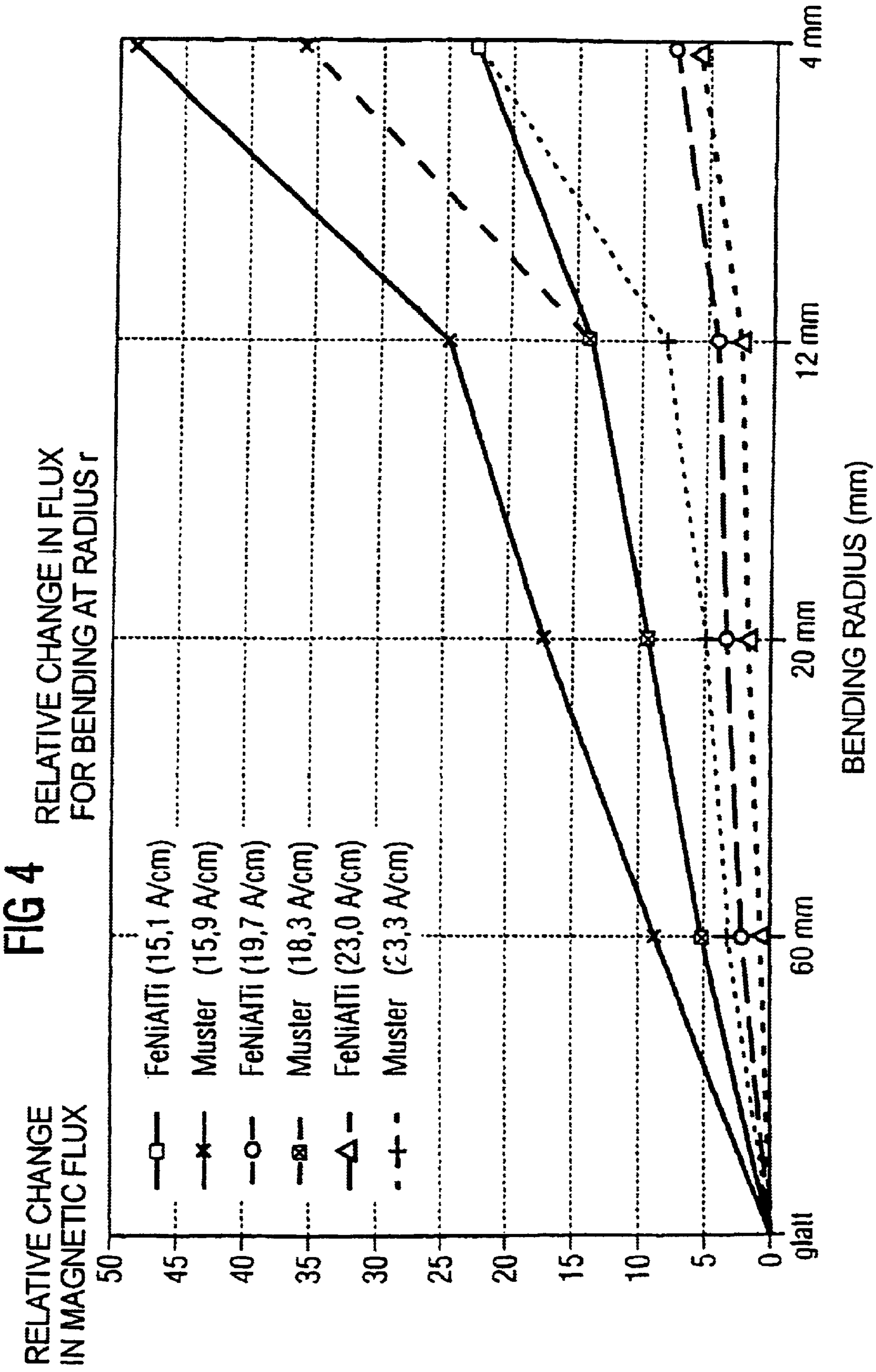

The invention is described in detail below on the basis of the drawing. Thereby shown are:

FIG. 1 the demagnetization behavior of Fe—Ni—Al—Ti alloys after an alternating field magnetization at 4 A/cm dependent on the coercive force;

FIG. 2 the demagnetization behavior of Fe—Ni—Al—Ti alloys after an alternating field magnetization at 20 A/cm dependent on the coercive force;

FIG. 3 the change of the remanence under tensile stress compared to an alloy of the Prior Art; and FIG. 4 the relative change of the magnetic flux in % at various coercive field strengths after mechanical deformation compared to an alloy of the Prior Art.

The following demands derive for the suitability of an alloy for an activation strip in an anti-theft security system, particularly for what is referred to as source tagging:

The change of the remanence under bending or, respectively, tensile stress should be optimally slight. A change of less than 20% is prescribed as guideline. As can be seen from FIG. 3, values ≦10% are achieved with the alloys of the present invention.

It derives from FIG. 4 that, in addition to being determined by the alloy, the coercive field strength and the bending radius also determine the change of the flux. Given corresponding coercive field strengths, the alloys according to the present invention achieve values <5% given bending radii ≧12 mm or, respectively, values <10% given bending radii ≧4 mm and thicknesses of approximately 50 $\mu$m.

The relationship of the saturation at a given, slight magnetizing field strength of, for example, 40 A/cm to the saturation $B_f$ given a magnetic field in the kOe range should be nearly 1, which can be seen from FIG. 3.

The opposing field stability should be of such a nature that the remanence $B_s$ still retains at least 80% of its original value after an opposing field magnetization of a few A/cm.

Finally, the remanence should retain only 20% of the original value after a demagnetization cycle with a predetermined magnetic field.

In detail, this means that a magnetization of the activation strip, i.e. an activation/deactivation of the display element, can also ensue on site. However, only very small fields are generally available there. The saturation that is achieved should differ only slightly from the value given high magnetizing fields in order to guarantee identical behavior of the display elements.

The display elements must be of such a nature that their remanence $B_r$ changes only slightly in the proximity of the coils in the detection locks as a consequence of a field that is elevated thereat and is potentially oriented in the opposite direction. As can be seen from FIG. 1, the inventive alloys exhibit an opposing field stability as demanded.

Finally, the display elements must be capable of being demagnetized with relatively small fields, i.e. deactivated given magneto-elastic display elements or, respectively, activated given harmonic display elements. FIG. 2 illustrates these relationships given the inventive alloys.

Simultaneously meeting these last three demands yields extremely great limitations for the accessible ranges of the coercive forces $H_c$ since the three demands are contradictory.

The alloys of the present invention are typically manufactured by casting a melt of the alloy constituents in a crucible or furnace under vacuum or a protective gas atmosphere. The temperatures thereby lie at approximately. 1600° C.

The casting typically ensues into a round ingot mold. The cast ingots of the present alloys are then typically processed by hot working, intermediate annealing, cold working and further intermediate annealing. The intermediate annealing ensues for the purpose of homogenization, grain sophistication, shaping or the creation of desirable mechanical properties, particularly a high ductility.

An excellent structure is achieved, for example, by the following processing:

Thermal treatment at, preferably, temperatures above 800° C., rapid cooling and annealing. Preferred annealing temperatures lie at 400° C. through 600° C., and the annealing times typically lie advantageously one minute through 24 hours. A cold working corresponding to a crossectional reduction of at least 60% before the annealing is, in particular, possible with the inventive alloys.

The coercive force and the rectangularity of the magnetic B–H loop are enhanced by the step of annealing, this being critical for the demands made of pre-magnetization strips.

The manufacturing method for especially good premagnetization strips comprises the following steps:

1. Casting at 1600° C.
2. Hot rolling of the ingot at temperature above 800° C.
3. Multi-hour intermediate annealing at above 800° C. with quenching in water.
4. Cold rolling corresponding to a crossectional reduction of approximately 90%.
5. Cold working corresponding to a crossectional reduction of, approximately 90%.
6. Intermediate annealing at approximately 700° C.
7. Multi-hour intermediate annealing at approximately 700° C.
8. Cold working corresponding to a crossectional reduction of approximately 70%.
9. Multi-hour annealing at approximately 480° C.
10. Cutting and trimming the activation strips.

Activation strips that exhibited an excellent coercive force $H_c$ and a very good remanence $B_r$ were manufactured with this method. The magnetization properties and the opposing field stability were excellent.

The manufacture of Fe—Ni—Al—Ti activation strips of the type under discussion is now described in detail on the basis of the following example:

Example 1

An alloy with 18.0 weight % nickel, 3.8 weight % aluminum, 1.0 weight % titanium and the balance iron was melted under vacuum. The resulting ingot was hot-rolled at approximately 1000° C., intermediately annealed for one hour at 1100° C. and rapidly cooled on water. After a subsequent cold-rolling with a crossectional reduction of 80%, the resulting tape was again intermediately annealed for one hour at 1100° C. and rapidly cooled in water. After a further cold working with a crossectional reduction of 50%, the tape was intermediately annealed for four hours at 650° C. Corresponding to a crossectional reduction of 90%, the tape was subsequently cold-rolled and annealed at 520° C. for three hours and cooled in air. A coercive force $H_c$ equal to 23 A/cm as well as a remanence $B_r$ equal to 1.48 T were measured.

Example 2

An alloy with 15.0 weight % nickel, 3.0 weight % aluminum, 1.2 weight % titanium and balance iron was processed as in Example 1 but with a last intermediate annealing at 700° C., a last cold working corresponding to a crossectional reduction of 70% as well as a final annealing at 500° C. A coercive force $H_c$ equal to 21 A/cm and a remanence $B_r$ equal to 1.45 T were measured.

Example 3

An alloy with 15.0 weight % nickel, 3.0 weight % aluminum, 1.2 weight % titanium and balance iron was manufactured as in Example 2. Deviating therefrom, the last intermediate annealing ensued at 650° C., the last cold working corresponding to a crossectional reduction of 85% and the annealing treatment at 480° C. A coercive force $H_c$ equal to 20 A/cm and a remanence $B_r$ equal to 1.53 T were measured.

Example 4

An alloy with 15.0 weight % nickel, 3.0 weight % aluminum, 1.2 weight % titanium, 2.0 weight % molybdenum and balance iron was manufactured as in Example 2. After an annealing treatment at 480° C., a coercive force $H_c$ equal to 20 A/cm and a remanence $B_r$ equal to 1.56 T were measured.

Example 5

An alloy with 15.0 weight % nickel, 2.0 weight % aluminum, 0.8 weight % titanium and balance iron was melted under vacuum. The resulting ingot was hot-rolled at approximately 1000° C., intermediately annealed at 900° C. for one hour and rapidly cooled in water. After a following cold-rolling with a crossectional reduction of 90%, the resulting tape was intermediately annealed for four hours at 650° C. Corresponding to a crossectional reduction of 95%, the tape was subsequently cold-rolled and annealed for three hours at 460° C. and air-cooled. A coercive force $H_c$ equal to 14 A/cm and a remanence $B_r$. equal to 1.46 T were measured.

Example 6

An alloy with 15.0 weight % nickel, 2.5 weight % aluminum, 1.2 weight % titanium and balance iron was manufactured as in Example 5 but with a crosssectional reduction of 83% and an annealing treatment at 420° C. A coercive force $H_c$ equal to 17 A/cm and a remanence $B_r$ equal to 1.44 T were measured.

A satisfactory magnetization behavior and a usable opposing field stability derived in all exemplary embodiments.

What is claimed is:

1. Display element for employment in a magnetic anti-theft security system, composed of:

1. an oblong alarm strip composed of an amorphous ferromagnetic alloy, and at least
2. one activation strip composed of a semi-hard magnetic alloy, characterized in that
   a) the semi-hard magnetic alloy of 8 to 25 weight % Ni 0.5 to 3 weight % Ti 1.5 to 4.5 weight % Al balance iron and b) the alloy can further contain 0 to 5 weight % cobalt and/or 0 to 3 weight % molybdenum or chromium and/or at least one of the elements Zr, Hf, V, Nb, Ta, W, Mn, Si in individual parts of less than 0.5 weight % of the alloy and in an overall part of less than 1 weight % of the alloy and/or at least one of the elements C, N, S, P, B,H, O in individual parts of less than 0.2 weight % of the alloy and in an overall part of less than 1 weight % of the alloy; and c) in that the semi-hard magnetic alloy exhibits a coercive force $H_c$ of 10 to 24 A/cm and a remanence $B_r$ of at least 1.3 T (13000 Gauss).

2. Display element according to claim 1, characterized in that the semi-hard magnetic alloy is composed of 8 to 25 weight % Ni 0.5 to 3 weight % Ti 1.5 to 4.5 weight % Al balance iron.

3. Method for manufacturing an activation strip characterized by the following method steps:

1. melting an alloy under vacuum or protective atmosphere and subsequent casting into an ingot;
2. hot-working of the ingot to form a tape at temperatures above approximately 800° C.;
3. intermediate annealing of the tape at a temperature above approximately 800° C.;
4. rapid cooling;
5. cold-working corresponding to a cross-sectional reduction of approximately 90%;
6. intermediate annealing at approximately 700° C.;
7. cold-working corresponding to a cross-sectional reduction of at least 85%;
8. annealing at a temperature of approximately 480° C.;
9. cutting and trimming the activation strips.

* * * * *